Aug. 28, 1962    W. A. ROCKAFIELD ETAL    3,051,372
HUB STRUCTURE FOR AN IMPELLER CENTER
PLATE AND METHOD FOR MAKING SAME
Filed April 18, 1960

INVENTORS
JOSEPH E. BRUNDAGE
WILDEN A. ROCKAFIELD
BY
Woodhams Blanchard & Flynn
ATTORNEYS United States Patent Office 3,051,372
Patented Aug. 28, 1962

3,051,372
HUB STRUCTURE FOR AN IMPELLER CENTER
PLATE AND METHOD FOR MAKING SAME
Wilden A. Rockafield and Joseph E. Brundage, Kalamazoo, Mich., assignors to The Brundage Company, Kalamazoo, Mich., a corporation of Michigan
Filed Apr. 18, 1960, Ser. No. 22,948
1 Claim. (Cl. 230—134)

This invention relates in general to a hub construction and, more particularly, to a type thereof which is adapted for securing the center plates of a centrifugal impeller upon a hollow shaft.

Persons acquainted with the construction of small centrifugal fans, such as those having sheet metal impellers, are well aware of the many advantages which can be gained by mounting the impellers of such fans upon hollow shafts. However, considerable difficulty has been encountered in the development of a suitable hub structure for mounting sheet metal impellers of various kinds upon hollow shafts. Thus, the problems which gave rise to this invention were encountered while attempting to use a hollow shaft for supporting a centrifugal impeller. Accordingly, specific reference is made herein to a centrifugal impeller and parts thereof for the purpose of illustrating a preferred embodiment of the invention. However, such specific reference is not intended to limit the scope of the invention, which has many useful applications in other fields.

Although the advantages of a hollow shaft have been well and long known, their use in ventilating fans has been somewhat restricted by the unavailability of a completely satisfactory hub construction for supporting the impeller upon the shaft. A hollow shaft is usually much larger in diameter, but is much lighter in weight, than a solid shaft for the same purpose. It is not economical to attempt to maintain in the diameter of a hollow shaft the dimensional accuracy which is normally provided in a solid shaft. Moreover, a hollow shaft can be distorted by applying thereto a radial force which would not affect a solid shaft. Because of these factors, the use of cast-type hubs has been impractical for mounting small impellers upon hollow shafts. That is, the relatively large hub structures are expensive both to cast and machine and this expense is substantially increased by the oversized diameter of the shaft. The large hub structure, particularly where it is cast from iron, adds substantially to the weight supported upon the shaft and thereby defeats the very purpose of using a hollow shaft, namely, to reduce the overall weight of the rotating member. Furthermore, the variations in diameter make it very difficult to provide a reasonably snug fit between the cast hub and the shaft.

Efforts have been made to overcome the above problems by providing the centerplates of centrifugal impellers with sheet metal hub structures which may or may not be integral with this center plate. This arrangement clearly avoids the weight problem and generally reduces the cost problem. However, such sheet metal hub structures as have been heretofore devised have not solved the problem of the variations in the shaft diameter and, in general, have merely aggravated this problem. That is, it is extremely difficult to hold sheet metal parts to the tolerances of a machined casting so that the inaccuracies in the sheet metal hub often become cumulative with the inaccuracies in the hollow shaft. Moreover, it has been extremely difficult to secure existing sheet metal hubs upon shafting, whether solid or hollow, without using expensive clamping devices or applying powerful clamping forces.

Accordingly, a primary object of this invention has been the provision of a completely satisfactory hub structure for mounting the center plates of a centrifugal impeller upon a hollow shaft.

A further object of this invention has been the provision of a hub structure, as aforesaid, which is simple in construction, which is extremely light in weight, which adapts itself easily and readily to variations in the diameter of the shaft resulting from the loose tolerances therein, which can be rigidly and firmly secured upon the shaft with a minimum of radially applied force and which is adaptable to a wide range of impeller and shaft sizes.

A further object of this invention has been the provision of a hub structure, as aforesaid, which is pleasing in appearance, which facilitates quick and easy assembly and disassembly, which can be fabricated according to the process set forth herein and which is sturdy and reliable under the most severe conditions of operations.

A further object of this invention has been a provision of a process whereby a hub construction of the character described hereinafter can be produced.

Other objects and purposes of this invention will become apparent to persons familiar with this type of equipment upon reading the following specification and examining the accompanying drawings, in which.

Figures 1, 2, 3, 4:
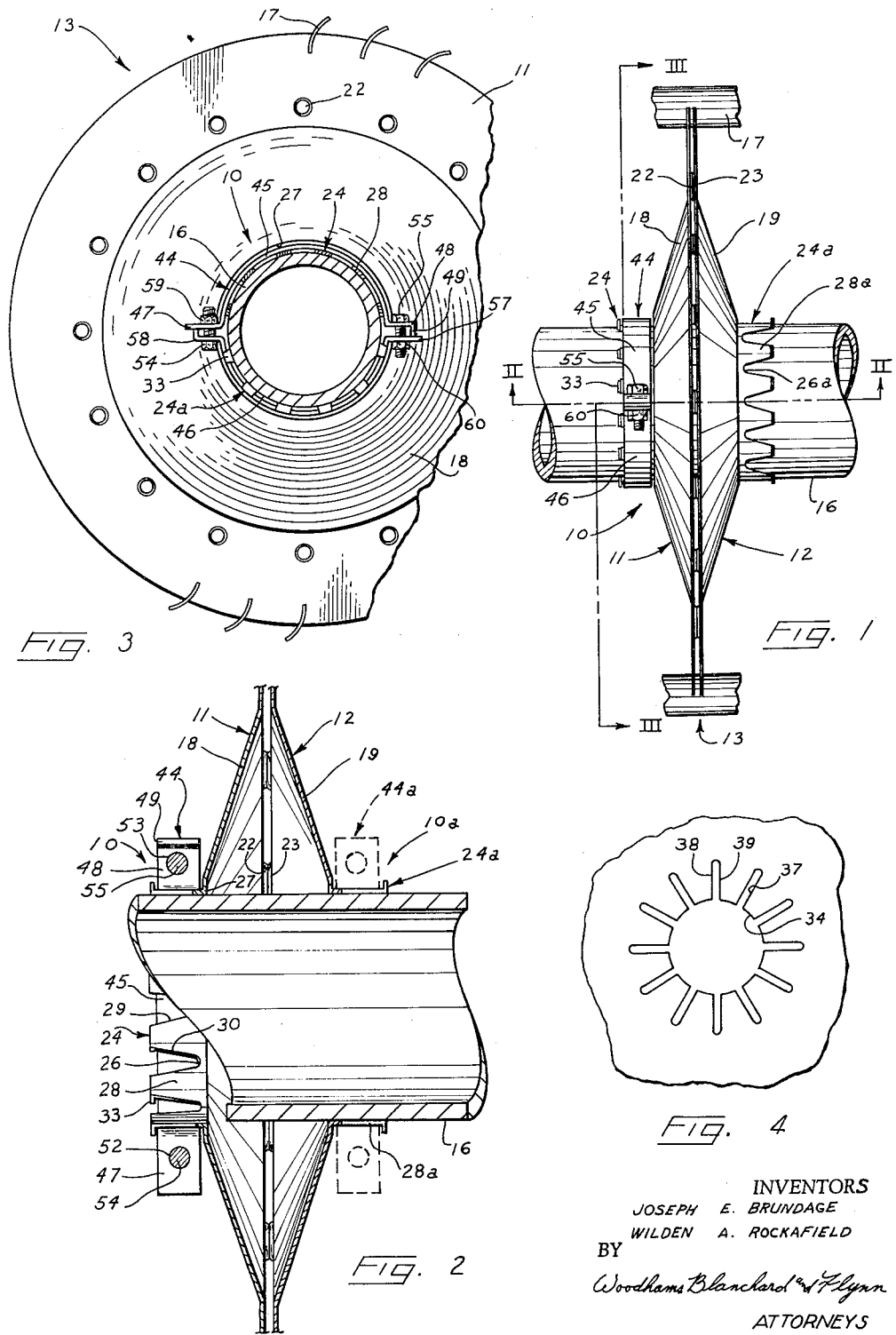
FIGURE 1 is a fragmentary, side elevational view of a centrifugal impeller embodying the hub construction of the invention and mounted upon a hollow shaft.
FIGURE 2 is a broken, sectional view taken along the line II—II in FIGURE 1.
FIGURE 3 is a broken, sectional view taken along the lines III—III in FIGURE 1.
FIGURE 4 is a fragment of the central portion of a center plate prior to the completion of the hub structure thereon.

For convenience in description, the terms "inner," "outer," derivatives thereof and words of similar import will have reference to the geometric center of the hub structure of the invention and parts associated therewith.

GENERAL DESCRIPTION

The objects and purposes of this invention, including those set forth above, have been met by providing a hub structure for the center plates of a centrifugal impeller, whereby said impeller can be securely mounted upon a hollow shaft. Said hub structure is comprised of a plurality of uniformly spaced fingers integral with, and extending in the same axial direction from, one of said center plates, said fingers being arranged to define a surface of revolution coaxial with the center plate and about equal in diameter to the outside diameter of the shaft with which the hub structure is used. The fingers are of substantially uniform radial thickness and have lengthwise edges which converge away from the center plate. The fingers are encircled by an annular clamp having adjustment means for reducing the diameter of said annular clamp whereby said fingers are snugly held against a shaft extending through the zone defined by said fingers. Stop means on the outer ends of said fingers cooperate with said center plate to restrict axial movement of the clamps.

The process of the invention, whereby a hub structure of the above-described character is produced, is best described in terms of a hub structure produced thereby and, accordingly, the disclosure of the method will be in such terms.

DETAILED DESCRIPTION

The hub structure 10 (FIGURE 1), which has been selected to illustrate a preferred embodiment and the method of the invention, is associated with the center plates 11 and 12 of a centrifugal impeller 13 for the purpose of mounting said impeller upon a hollow shaft 16. The hub structures 10 and 10a on the center plates 11 and 12, respectively, may be and preferably are substantially identical. Accordingly, the hub structure 10 will be described in detail and such description will be understood to apply in substance to the hub structure 10a. Moreover, parts of hub structure 10a will carry the same numerical designation as the corresponding parts of the hub structure 10 in addition to the suffix "a."

The center plates 11 and 12 are preferably identical and are engaged at their periphery by a plurality of impeller blades 17 which may be of any conventional type, shape or configuration. In this particular embodiment, the center plates 11 and 12 have identical conical portions 18 and 19 which are spaced inwardly from the radially outer edges thereof, said conical portions being offset away from each other. Said center plates each have an identical, circular row of uniformly spaced and axially aligned bosses 22 and 23 on their adjacent sides. The bosses on one plate are engageable with those on the other plate for spacing said center plates 11 and 12 from each other to facilitate the drainage of paint from the center plates after they are dip-painted. The center plates may be connected together by welding at the points of contact between said bosses 22 and 23, which may be produced by offsetting portions of said center plates between the conical portions and the peripheries thereof.

The structure 10 (FIGURES 1 and 2) is comprised of an integral and substantially cylindrical collar 24 which is coaxial with, and is disposed radially inwardly of, the conical portion 18. The collar 24, as shown in FIGURE 2, has a plurality of uniformly spaced, V-shaped slots 26 which diverge axially outwardly from points near to, but preferably spaced from, the central portion 27 of said center plate 11. Accordingly, the fingers 28 defined between adjacent slots 26 have edges 29 and 30 which converge away from the center plate.

The fingers 28 (FIGURE 3) are preferably arcuate transversely of their lengthwise extent, which is circumferentially of the collar 24, so that their concave surfaces face radially inwardly. By this construction, they materially resist radially outward deflection from the positions within said collar, but resist with substantially less force radially inward deflection away from said positions.

The outer ends of the fingers 28 (FIGURE 2) have radially outwardly extending, integral flanges 33 which preferably project beyond the outer surface of said collar 24 a distance about equal to the thickness of said flanges. The fingers 28 (FIGURE 2) are preferably formed by punching through the planar, central portion 27 of the center plate 11 a coaxial circular opening 34. The part of the central portion 27 adjacent to the opening 34 is lanced, either simultaneously or sequentially with the punching operation, to provide a plurality of uniformly spaced and radially disposed slots 37 which, after further operations, become the V-shaped slots 26 of FIGURE 2. The slots 37 are of uniform length and each slot has substantially parallel, lengthwise edges 38 and 39. However, these limitations may be varied, particularly where the diameter of the opening 34 is relatively large.

The radially inner ends of the fingers 28 (FIGURE 4) are bent, as by suitable extension dies, in the same axial direction to form the flanges 33 (FIGURE 2). Thereafter, the central portion 27 of the center plate 11 is shaped by appropriate dies to form a collar which extends from said center plate in the direction of said flanges.

A collar 24a (FIGURE 1) having uniformly spaced slots 26a defining fingers 28a may be provided on the center plate 12 in substantially the same manner and arrangement as set forth above with respect to the corresponding parts of the hub structure 10. As shown in FIGURE 1, the fingers 28 and 28a on a pair of assembled center plates 11 and 12 extend in opposite axial directions in order to be accessible for purposes set forth hereinafter.

The collar 24 is encircled by an annular clamp 44 which, in this embodiment, is comprised of a pair of semicircular, preferably identical straps 45 and 46 (FIGURE 3) which are preferably fabricated from durable, stiff and flexible material, such as steel. The semicircular strap 45 has at its opposite circumferential ends a pair of integral, radially disposed flanges 47 and 48. The end portion 49 of the flange 48 is bent perpendicularly thereto away from the remainder of the strap 45. As shown in FIGURE 2, the flanges 47 and 48 have bolt openings 52 and 53 through which bolts 54 and 55 are slidably extendable.

The semicircular strap 46 (FIGURE 3) has flanges 57 and 58 which may be substantially identical to the flanges 47 and 48, respectively. Nuts 59 and 60 are applied to the bolts 54 and 55 for securing the flanges of the straps 45 and 46 with respect to each other. When the flanges on the strap 46 are disposed with respect to the flanges on the strap 46 as shown in FIGURE 3, the inner surfaces of the arcuate portions of said straps are substantially positioned to define a cylinder having the diameter of the normal outside diameter of the collar 24 when the fingers 28 thereof are pressed firmly against the outer surface of the shaft 16. An annular clamp 44a (FIGURE 2), which is substantially identical to the annular clamp 44, may be mounted upon the collar 24a in substantially the same manner and for substantially the same purposes as set forth above with respect to annular clamp 44.

OPERATION

The hub structure of the invention, when utilized in conjunction with the centrifugal impeller 13, for example, may be assembled upon a shaft 16 either before or after the annular clamp 44 is mounted thereon. If desired, the clamp 44 and the collar 34 may be assembled and arranged so that the fingers 28 on diametrically opposite sides of the collar 24 diverge slightly with respect to each other away from the center plate, whereby mounting of the collar 24 upon the shaft is facilitated. However, even where the collar 24 is substantially cylindrical, the flanges 33 on the ends of the fingers 28 also aid materially in guiding the entry of the shaft 16 into the collar 24.

When the hub structures 10 and 10a are properly located upon the shaft 16, the nuts 59 and 60 are tightened upon the bolts 54 and 55 until the fingers 28 are clamped tightly against the outer surface of the shaft 16. Under normal circumstances, this condition will occur when the semicircular straps 46 and 47 are positioned as shown in FIGURE 3.

As the nuts 59 and 60 are tightened upon the bolts 54 and 55, those edge portions of the straps 45 and 46 remote from the center plate 11 and extending between the fingers 28 tend to bear more forcefully against the edges 29 and 30 of said fingers and thereby cause them to bite into the surface of the shaft 16. This condition can be enhanced by forming the collar 24 so that the transverse curvature of the fingers 28 is of smaller radius than the radius of the collar.

The engagement of the shaft 16 by the edges 29 of the fingers 28 will positively oppose rotation of the collar 24 in one rotational direction around the shaft 16, whereas the edges 30 of said fingers 28 will positively oppose such rotation in the reverse direction. Because the edges 29 and 30 are at a slight angle to the lengthwise extent of the shaft 16, they also oppose axial movement along said shaft in a direction away from the center plate. The fingers on the two collars 24 and 24a cooperate to respectively oppose such axial movement in opposite directions.

The fingers 28 can be readily flexed toward the shaft, particularly near the outer ends thereof where the gripping between the collar and the shaft surfaces is primarily accomplished. Thus, gripping of the shaft by the collar 24 can be achieved with only a moderate amount of pressure produced by the clamp 44. Accordingly, the clamp 44 can be fabricated from relatively soft metals or similar materials which are flexible and light in weight. Moreover, the relatively small amount of pressure required virtually eliminates the possibility of distorting the shaft out of its round position during the clamping procedure.

The metal collar 24 creates not only a substantial weight saving as compared with a cast type hub, but such weight is further reduced by eliminating the material which would otherwise be disposed within the slots 26. Accordingly, it may be possible under some circumstances to save enough to permit the use of a slightly smaller shaft size or thickness than would otherwise be required.

Under some circumstances it may be possible to utilize the hub structure of this invention in conjunction with a single center plate or on two center plates which are substantially spaced from each other. Thus, although a particular preferred embodiment of the invention has been disclosed above for illustrative purposes, it will be understood that variations or modifications of such disclosure, which lie within the scope of the appended claim, are fully contemplated.

What is claimed is:

In a centrifugal impeller having a pair of adjacent, substantially identical center plates and a plurality of blades engaged by the peripheral portions of said center plates, a hub construction for mounting the impeller upon a hollow shaft, comprising: a plurality of uniformly spaced and substantially identical fingers arranged in two sets respectively integral with and extending in opposite axial directions from said center plates, the set of fingers on each center plate having transversely curved, concave inner surfaces substantially arranged to define a cylinder having a diameter approximately equal to the outside diameter of the shaft, said surfaces being snugly engageable with said shaft, the axially extending edges of each finger converging away from said center plate to define V-shaped slots between adjacent fingers; stop means on the radially outer surface of at least some of said fingers, said stop means being spaced from said center plate; annular clamp means encircling and snugly embracing the radially outer surfaces of each set of fingers between said stop means and said center plate; and adjustment means on said clamp means for reducing the circumference thereof, whereby said axially extending edges of said fingers are urged radially inwardly against the shaft embraced by said fingers to oppose axial movement thereof in said direction of their extension, so that said sets of fingers coact to oppose positively rotational and axial movement of said impeller with respect to the shaft.

References Cited in the file of this patent

UNITED STATES PATENTS

| | | |
|---|---|---|
| 1,642,165 | McCaffrey | Sept. 13, 1927 |
| 1,684,601 | Shpater | Sept. 18, 1928 |
| 1,995,542 | Haviland | Mar. 26, 1935 |
| 2,025,271 | Compo | Dec. 24, 1935 |
| 2,096,926 | Schawhan et al. | Oct. 26, 1937 |
| 2,315,407 | Evans | Mar. 30, 1943 |
| 2,350,739 | Ferre | June 6, 1944 |
| 2,626,741 | Osborne | Jan. 27, 1953 |
| 2,673,390 | Broberg | Mar. 30, 1954 |

FOREIGN PATENTS

| | | |
|---|---|---|
| 475,813 | Canada | Aug. 7, 1951 |